United States Patent
Saito et al.

(10) Patent No.: US 10,145,275 B2
(45) Date of Patent: Dec. 4, 2018

(54) OIL DETERIORATION PREVENTION DEVICE

(71) Applicants: TOYOTA BOSHOKU KABUSHIKI KAISHA, Aichi (JP); TOYOTA JIDOSHA KABUSHIKI KAISHA, Aichi (JP)

(72) Inventors: Yasuhiro Saito, Aichi (JP); Hideto Morishita, Gifu (JP); Ippei Fukutomi, Tokyo (JP); Motoichi Murakami, Shizuoka (JP); Katsuichi Miyasaka, Shizuoka (JP); Masatoshi Hiyoshi, Aichi (JP); Koji Morita, Shizuoka (JP)

(73) Assignees: TOYOTA BOSHOKU KABUSHIKI KAISHA, Aichi (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 474 days.

(21) Appl. No.: 14/350,409

(22) PCT Filed: Oct. 18, 2012

(86) PCT No.: PCT/JP2012/077005
§ 371 (c)(1),
(2) Date: Apr. 8, 2014

(87) PCT Pub. No.: WO2013/069428
PCT Pub. Date: May 16, 2013

(65) Prior Publication Data
US 2014/0251883 A1    Sep. 11, 2014

(30) Foreign Application Priority Data

Nov. 7, 2011 (JP) ................................. 2011-243926
May 7, 2012 (JP) ................................. 2012-106263

(51) Int. Cl.
*F01M 11/03* (2006.01)
*F01M 11/10* (2006.01)
(Continued)

(52) U.S. Cl.
CPC ............. *F01M 11/03* (2013.01); *B01D 27/00* (2013.01); *B01D 37/025* (2013.01); *F01M 1/10* (2013.01);
(Continued)

(58) Field of Classification Search
None
See application file for complete search history.

(56) References Cited

U.S. PATENT DOCUMENTS 1,084,030 A * 1/1914 Ramsey ............... B01D 35/153
                                                        210/234
1,981,089 A * 11/1934 Carpenter ........ C10M 175/0058
                                                        165/119
(Continued)

FOREIGN PATENT DOCUMENTS

CN         103906900        7/2014
DE         603 06 401 T2    6/2007
(Continued)

OTHER PUBLICATIONS

Office Action issued in U.S. Appl. No. 14/350,413, dated Nov. 23, 2016.
(Continued)

*Primary Examiner* — Robert J Popovics
(74) *Attorney, Agent, or Firm* — Greenblum & Bernstein, P.L.C.

(57) ABSTRACT

An oil deterioration prevention device is provided that can prevent an increase in pressure loss by reducing oilflow resistance. The oil deterioration prevention device may include a filtering unit with a filter element that filters oil,
(Continued)

and a deterioration prevention unit having a powdery deterioration prevention agent that prevents deterioration of oil, wherein out of oil fed from an oil containing unit, oil filtered by the filtering unit is fed to a part to be lubricated, and oil that is prevented from being deteriorated by the deterioration prevention unit is returned to the oil containing unit or sent to the part to be lubricated.

7 Claims, 5 Drawing Sheets

(51) Int. Cl.
    *F01M 9/02*       (2006.01)
    *B01D 37/02*     (2006.01)
    *B01D 27/00*     (2006.01)
    *F01M 1/10*       (2006.01)

(52) U.S. Cl.
    CPC ....... *F01M 9/02* (2013.01); *F01M 2001/1014* (2013.01)

(56) References Cited

U.S. PATENT DOCUMENTS

| | | | | |
|---|---|---|---|---|
| 2,073,442 A * | 3/1937 | Briggs | B01D 27/00 | 210/130 |
| 2,083,546 A * | 6/1937 | Aldham | B01D 25/24 | 210/453 |
| 2,098,725 A * | 11/1937 | Hurn | B01D 35/16 | 210/132 |
| 2,103,434 A * | 12/1937 | Pennebaker | B01D 27/00 | 210/182 |
| 2,110,009 A * | 3/1938 | Weidenbacker | B01D 27/00 | 210/131 |
| 2,148,708 A * | 2/1939 | Orr | B01D 27/00 | 210/484 |
| 2,154,565 A * | 4/1939 | Fife | B01D 25/26 | 210/343 |
| 2,181,608 A * | 11/1939 | Russell | C10M 175/0008 | 210/283 |
| 2,207,399 A * | 7/1940 | Gaertner | C10G 31/00 | 210/130 |
| 2,209,180 A * | 7/1940 | Von Pentz | B01D 27/005 | 210/484 |
| 2,233,093 A * | 2/1941 | Carman | B01D 27/005 | 174/15.1 |
| 2,300,014 A * | 10/1942 | Saussure | B01D 24/008 | 210/266 |
| 2,328,131 A * | 8/1943 | Eisler | B01D 35/14 | 210/224 |
| 2,680,520 A * | 6/1954 | Beardsley | B01D 29/54 | 210/239 |
| 2,785,805 A * | 3/1957 | Hough | B01D 29/15 | 210/295 |
| 2,995,253 A * | 8/1961 | Belgarde | B01D 27/08 | 210/130 |
| 3,054,507 A | 9/1962 | Humbert, Jr. et al. | | |
| 3,095,370 A * | 6/1963 | Krogman | B01D 25/24 | 210/133 |
| 3,144,407 A * | 8/1964 | Olmos | B01D 17/045 | 210/307 |
| 3,158,571 A * | 11/1964 | Supinger | B01D 27/00 | 148/DIG. 130 |
| 3,210,229 A * | 10/1965 | Feine | B01D 17/045 | 138/141 |
| 3,224,592 A | 12/1965 | Burns et al. | | |
| 3,312,350 A * | 4/1967 | Kasten | B01D 17/0214 | 210/307 |
| 3,390,778 A * | 7/1968 | Uhen | B01D 27/06 | 210/314 |
| 3,465,883 A * | 9/1969 | Jumper | B01D 29/23 | 210/307 |
| 3,467,256 A * | 9/1969 | Kingsley, Jr. | B01D 27/06 | 210/132 |
| 3,529,719 A * | 9/1970 | Gravbill | B01D 21/0012 | 208/182 |
| 3,591,010 A | 7/1971 | Pall et al. | | |
| 3,837,495 A * | 9/1974 | Baldwin | B01D 27/02 | 210/314 |
| 3,975,273 A * | 8/1976 | Shaltz | B01D 27/02 | 210/314 |
| 4,036,755 A * | 7/1977 | Dahm | B01D 27/08 | 210/167.04 |
| 4,048,071 A | 9/1977 | Yamada et al. | | |
| 4,094,791 A * | 6/1978 | Conrad | B01D 29/54 | 210/248 |
| 4,144,166 A * | 3/1979 | DeJovine | B01D 37/025 | 208/180 |
| 4,265,748 A | 5/1981 | Villani et al. | | |
| 4,384,962 A * | 5/1983 | Harris | B01D 17/0208 | 210/259 |
| 4,557,829 A * | 12/1985 | Fields | B01D 27/02 | 210/132 |
| 4,695,377 A * | 9/1987 | Medley, III | B01D 27/08 | 210/132 |
| 4,802,979 A * | 2/1989 | Medley, III | B01D 27/08 | 210/132 |
| 4,828,698 A * | 5/1989 | Jewell | B01D 27/02 | 210/266 |
| 4,950,400 A * | 8/1990 | Girondi | B01D 27/144 | 210/335 |
| 5,017,285 A * | 5/1991 | Janik | B01D 17/00 | 210/232 |
| 5,035,797 A * | 7/1991 | Janik | B01D 27/08 | 210/232 |
| 5,069,799 A | 12/1991 | Brownawell et al. | | |
| 5,078,877 A * | 1/1992 | Cudaback | B01D 27/06 | 210/315 |
| 5,084,170 A * | 1/1992 | Janik | B01D 17/00 | 210/232 |
| 5,591,330 A * | 1/1997 | Lefebvre | B01D 37/025 | 210/203 |
| 5,718,258 A * | 2/1998 | Lefebvre | B01D 37/025 | 137/268 |
| 5,725,031 A * | 3/1998 | Bilski | B01D 37/025 | 141/2 |
| 6,045,692 A * | 4/2000 | Bilski | B01D 37/025 | 123/1 A |
| 6,379,564 B1 | 4/2002 | Rohrbach et al. | | |
| 6,391,193 B1 * | 5/2002 | Luka | B01D 27/06 | 210/130 |
| 6,919,023 B2 * | 7/2005 | Merritt | B01D 27/08 | 123/196 A |
| 6,969,461 B2 * | 11/2005 | Beard | B01D 27/005 | 210/203 |
| 6,984,319 B2 * | 1/2006 | Merritt | B01D 29/15 | 123/196 A |
| 7,018,531 B2 * | 3/2006 | Eilers | B01D 27/02 | 141/2 |
| 7,132,047 B2 * | 11/2006 | Beard | B01D 27/005 | 210/203 |
| 7,182,863 B2 * | 2/2007 | Eilers | B01D 27/00 | 141/2 |
| 7,232,521 B2 * | 6/2007 | Merritt | B01D 29/15 | 123/196 A |
| 7,238,285 B2 * | 7/2007 | Hacker | B01D 27/06 | 210/206 |
| 7,250,126 B2 * | 7/2007 | Haberkamp | B01D 39/18 | 264/122 |
| 7,267,769 B2 * | 9/2007 | Baird | B01D 61/025 | 210/232 |
| 7,323,102 B2 * | 1/2008 | Klein | B01D 27/06 | 210/206 |
| 7,410,572 B2 * | 8/2008 | Beard | B01D 27/005 | 210/203 |
| 7,811,462 B2 * | 10/2010 | Eilers | B01D 27/00 | 141/2 |

(56) References Cited

U.S. PATENT DOCUMENTS

| | | | |
|---|---|---|---|
| 7,931,817 B2* | 4/2011 | Bilski | B01D 27/08 137/2 |
| 8,327,818 B2* | 12/2012 | Jefferies | B01D 37/025 123/196 A |
| 8,425,772 B2* | 4/2013 | Martin | B01D 37/025 210/206 |
| 8,772,208 B2* | 7/2014 | Fukutomi | C10M 125/10 508/154 |
| 8,887,689 B2* | 11/2014 | Harada | F01M 1/10 123/196 A |
| 9,844,743 B2* | 12/2017 | Saito | B01D 24/10 |
| 2002/0043495 A1* | 4/2002 | Beard | B01D 27/005 210/416.1 |
| 2002/0195384 A1 | 12/2002 | Rohrbach et al. | |
| 2003/0111398 A1* | 6/2003 | Eilers | B01D 27/02 210/209 |
| 2003/0226793 A1* | 12/2003 | Merritt | B01D 29/15 210/206 |
| 2004/0140254 A1* | 7/2004 | Merritt | B01D 27/08 210/232 |
| 2004/0140255 A1* | 7/2004 | Merritt | B01D 29/15 210/232 |
| 2005/0040092 A1* | 2/2005 | Eilers | B01D 27/00 210/209 |
| 2005/0173325 A1* | 8/2005 | Klein | B01D 27/06 210/206 |
| 2005/0194301 A1 | 9/2005 | Hacker et al. | |
| 2006/0000760 A1* | 1/2006 | Beard | B01D 27/005 210/203 |
| 2006/0032814 A1* | 2/2006 | Haberkamp | B01D 39/18 210/502.1 |
| 2006/0065601 A1* | 3/2006 | Baird | B01D 61/025 210/652 |
| 2006/0260874 A1 | 11/2006 | Lockledge et al. | |
| 2007/0034559 A1* | 2/2007 | Beard | B01D 27/005 210/203 |
| 2008/0135467 A1 | 6/2008 | Martin et al. | |
| 2009/0221755 A1* | 9/2009 | Aoki | C08L 67/04 525/190 |
| 2010/0108018 A1* | 5/2010 | Jefferies | B01D 37/025 123/196 R |
| 2010/0163496 A1* | 7/2010 | Bilski | B01D 37/02 210/741 |
| 2011/0084010 A1 | 4/2011 | Mordukhovich et al. | |
| 2011/0278215 A1* | 11/2011 | Martin | B01D 37/025 210/209 |
| 2012/0238480 A1* | 9/2012 | Fukutomi | C10M 125/10 508/170 |
| 2012/0312731 A1 | 12/2012 | Ohmiya et al. | |
| 2013/0292318 A1 | 11/2013 | Morishita et al. | |
| 2013/0340705 A1* | 12/2013 | Harada | F01M 1/10 123/196 A |
| 2014/0001108 A1* | 1/2014 | Fukutonni | F01M 1/10 210/167.04 |
| 2014/0251883 A1* | 9/2014 | Saito | F01M 11/03 210/167.02 |
| 2014/0263022 A1 | 9/2014 | Saito et al. | |
| 2015/0008170 A1* | 1/2015 | Fukutomi | C10M 163/00 210/167.08 |

FOREIGN PATENT DOCUMENTS

| | | |
|---|---|---|
| EP | 0842689 | 5/1998 |
| JP | 61-29764 | 7/1986 |
| JP | 62-021289 | 5/1987 |
| JP | S63-005762 | 2/1988 |
| JP | 63-046088 | 12/1988 |
| JP | 03-174207 | 7/1991 |
| JP | H03-296408 | 12/1991 |
| JP | H10-071306 | 3/1998 |
| JP | H11-22442 | 1/1999 |
| JP | 2001-38119 | 2/2001 |
| JP | 2003-532536 | 11/2003 |
| JP | 2005-502803 | 1/2005 |
| JP | 2008-126088 | 6/2008 |
| JP | 2008-540123 | 11/2008 |
| JP | 2011-256826 | 12/2011 |
| WO | WO02/096534 | 12/2002 |
| WO | 03/010421 | 2/2003 |
| WO | WO2006/127652 | 11/2006 |
| WO | 2008/112997 | 9/2008 |
| WO | 2011/093519 | 8/2011 |
| WO | WO01/85882 | 11/2011 |

OTHER PUBLICATIONS

Search report from E.P.O., dated Oct. 31, 2014.
Xiu S. Zhao et al., "Advances in Mesoporous Molecular Sieve MCM-41", American Chemical Society, Jun. 1, 1996, pp. 2075-2090.
S. Balci, "Effect of heating and acid pre-treatment on pore size distribution of sepiolite", The Mineralogical Society, Jan. 15, 1999, pp. 647-655.
Y.C. Ke et al., "Polymer-Layered Silicate and Silica Nanocomposites", Elsevier, Amsterdam, 2005, 3 total pages.
Japan Office action, dated Apr. 8, 2014 along with an English translation.
International Search Report dated Jan. 8, 2013.
Office Action issued in China Counterpart Patent Appl. No. 201280051993.4, dated Sep. 6, 2015 , along with an English translation thereof.
Office Action issued in U.S.A. Counterpart Patent Appl. No. 14/350,413, dated Apr. 27, 2017.
Office Action issued in U.S. Appl. No. 14/350,413, dated Mar. 14, 2017.
Notice of Allowance issued in United States Counterpart Patent Appl. No. 14/350,413, dated Aug. 14, 2017.
Office Action issued in U.S. Appl. No. 13/865,509, dated Jan. 5, 2018.
Office Action issued in European Patent Office (EPO) Counterpart Patent Appl. No. 12847610.8, dated Dec. 21, 2017.
Office Action issued in European Patent Office (EPO) Counterpart Patent Appl. No. 12846907.9, dated Sep. 5, 2017.

* cited by examiner

OIL DETERIORATION PREVENTION DEVICE

TECHNICAL FIELD

The present invention relates to an oil deterioration prevention device, and more particularly to an oil deterioration prevention device that can prevent increase in pressure loss by reducing oilflow resistance.

BACKGROUND ART

Figure 9:
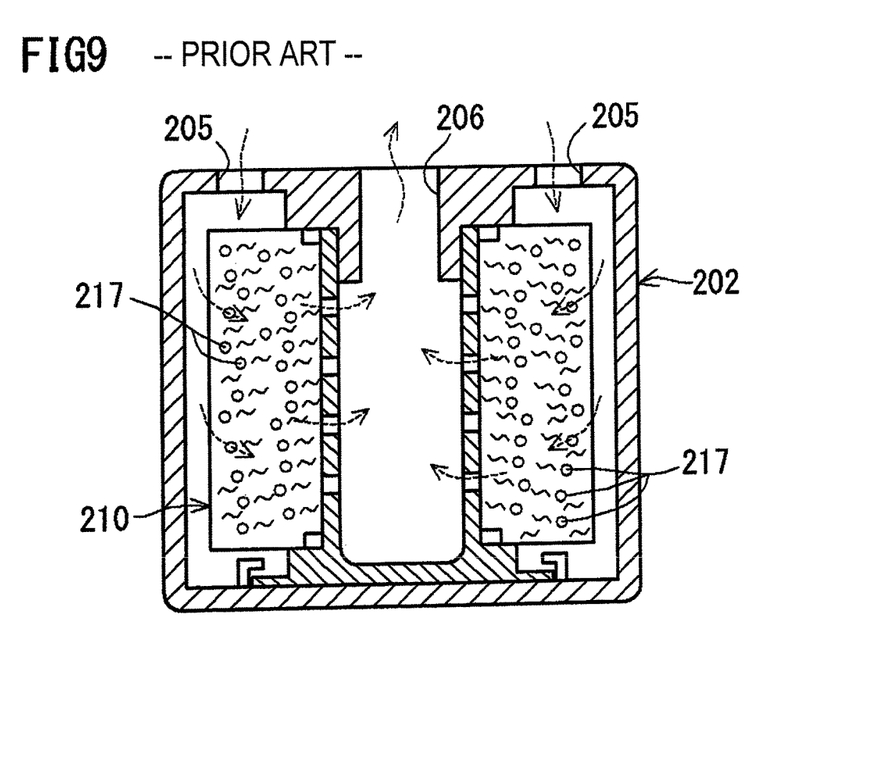
FIG. 9 is a longitudinal sectional view illustrating a conventional oil deterioration prevention device.

There has been conventionally known a filter element including fine particles (e.g., hydrotalcite) and fibers for removing carbon, acid, deteriorated substances, and the like produced in an internal combustion engine (e.g., see Patent Literature 1). As illustrated in FIG. 9, in an oil filter using this filtering element, a housing 202 housing a filter element 210 is provided with an oil inflow passage 205 that allows oil fed from an oil pan to flow into the housing 202, and an oil outflow passage 206 that allows oil filtered by the filter element 210 to flow toward apart to be lubricated in an engine (e.g., a crankshaft, a cylinder wall, and a valve mechanism). The oil flown into the housing 202 from the oil inflow passage 205 is filtered by the filter element 210 with carbon being removed therefrom by fine particles 217, and then, is flown toward the part to be lubricated in the engine from the oil outflow passage 206.

CITATION LIST

Patent Literature

[Patent Literature 1] Japanese Unexamined Patent Publication No. 03-296408

DISCLOSURE OF INVENTION

Problem to be Solved by the Invention

However, the conventional oil filter employs a system in which all oil fed from the oil pan passes through the filter element (a so-called full-flow system), so that it entails a problem of increase in pressure loss because the fine particles, such as hydrotalcite, forming the filter element acts as resistance.

The present invention is accomplished in view of the foregoing circumstance, and aims to provide an oil deterioration prevention device that can prevent increase in pressure loss by reducing oilflow resistance.

Means for Solving Problem

To solve the problems above, the invention described in claim 1 is an oil deterioration prevention device which is summarized that comprising: a filtering unit including a filter element that filters oil; and a deterioration prevention unit including a powdery deterioration prevention agent that prevents deterioration of oil, wherein out of oil fed from an oil containing unit, oil filtered by the filtering unit is fed to a part to be lubricated, and oil that is prevented from being deteriorated by the deterioration prevention unit is returned to the oil containing unit or sent to the part to be lubricated.

The invention described in claim 2 is the oil deterioration prevention device according to claim 1, which is summarized that the deterioration prevention unit includes a porous layer that retains the deterioration prevention agent and that allows oil to pass.

The invention described in claim 3 is the oil deterioration prevention device according to claim 2, which is summarized that the porous layer includes a first porous layer and a second porous layer that are stacked in a passing direction of oil, and the porosity of the first porous layer on an upstream side is larger than the porosity of the second porous layer on a downstream side.

The invention described in claim 4 is the oil deterioration prevention device according to claim 2 or 3, which is summarized that the deterioration prevention unit includes an intermediate layer that is arranged between a plurality of the porous layers, does not allow the deterioration prevention agent to pass, and allows oil to pass.

The invention described in claim 5 is the oil deterioration prevention device according to any one of Claims 1 to 4, which is summarized that further comprising a housing that houses the filtering unit and the deterioration prevention unit, wherein the housing is provided with an oil inflow passage for allowing oil fed from the oil containing unit to flow into the housing, an oil outflow passage for allowing oil filtered by the filtering unit to flow toward the part to be lubricated, and an oil returning passage for returning oil that is prevented from being deteriorated by the deterioration prevention unit to the oil containing unit.

Effect of the Invention

According to the oil deterioration prevention device of the present invention, out of oil fed from the oil containing unit, oil filtered by the filtering unit is fed to the part to be lubricated, while oil that is prevented from being deteriorated by the deterioration prevention unit is returned to the oil containing unit or to the part to be lubricated. According to this configuration, some oil fed from the oil containing unit undergoes bypass flow, whereby oilflow resistance is reduced, resulting in preventing increase in pressure loss.

When the deterioration prevention unit includes a porous layer, the deterioration prevention agent can be retained in the porous layer in an appropriately dispersed manner, whereby the oilflow resistance can further be reduced, and the oil deterioration prevention effect by the deterioration prevention unit can further be enhanced.

When the porous layer includes a first porous layer and a second porous layer, and the porosity of the first porous layer on the upstream side is larger than the porosity of the second porous layer on the downstream side, the second porous layer can retain more deterioration prevention agents than the first porous layer. Therefore, oil gradually spreads and flows from the first porous layer to the second porous layer. Accordingly, the oilflow resistance can further be reduced, and the oil deterioration prevention effect by the deterioration prevention unit can further be enhanced.

When the deterioration prevention unit includes an intermediate layer, the deterioration prevention agent does not move among a plurality of the porous layers due to the intermediate layer. Therefore, aggregation of the deterioration prevention agent on the downstream porous layer can be prevented. Accordingly, the oilflow resistance can further be reduced, and the oil deterioration prevention effect by the deterioration prevention unit can further be enhanced.

When the deterioration prevention device includes a housing that houses the filtering unit and the deterioration prevention unit, and the housing is provided with an oil inflow passage, an oil outflow passage, and an oil returning passage, oil fed from the oil containing unit is flown into the housing through the oil inflow passage, oil filtered by the filtering unit is flown to the part to be lubricated through the oil outflow passage, and oil that is prevented from being deteriorated by the deterioration prevention unit is returned to the oil containing unit through the oil returning passage. According to this configuration, the oil deterioration prevention device, the filtering unit, and the deterioration prevention unit can easily be replaced.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

EMBODIMENTS OF CARRYING OUT THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

1. Oil Deterioration Prevention Device

An oil deterioration prevention device (1, 101) according to the present first embodiment includes a filtering unit (3, 103) having a filter element (10) that filters oil, and a deterioration prevention unit (4, 104) having a powdery deterioration prevention agent (17) that prevents deterioration of oil. In the oil deterioration prevention device (1, 101), out of oil fed from an oil containing unit (9), oil filtered by the filtering unit is fed to a part to be lubricated, and oil that is prevented from being deteriorated by the deterioration prevention unit is returned to the oil containing unit (9) or fed to the part to be lubricated (see, for example, FIGS. 1 and 5).

Examples of the "oil containing unit" include an oil pan used in a wet sump engine, an oil tank used in a dry sump engine, and an oil pan used in an automatic transmission. Examples of the "part to be lubricated" include mechanisms in an engine (for example, a crankshaft, a cylinder wall, and a valve mechanism), and mechanisms of an automatic transmission. The "filter element" can employ any type and any shape, so long as it can filter oil. Examples of the material for the filter element include fibrous material such as non-woven cloth, paper, woven fabric, or knitted fabric, a resin open-cell foamed material such as urethane, and a porous resin film. The "powdery deterioration prevention agent" described above can employ any type or any deterioration prevention manner, so long as it can prevent deterioration of oil. Examples of the deterioration prevention agent includes an inorganic ion-exchange material such as hydrotalcite, bismuth, cerium carbonate, zirconium hydroxide, titanate-supported zirconia, or zirconium oxycarbonate, and an ion-exchange resin material such as DIAION (trade name). The deterioration prevention agent is preferably hydrotalcite among these materials from the viewpoint of adsorptive property of foreign matters in oil (particularly, acid substances generated in the engine), heat resistance, and environment resistance.

Figure 1:
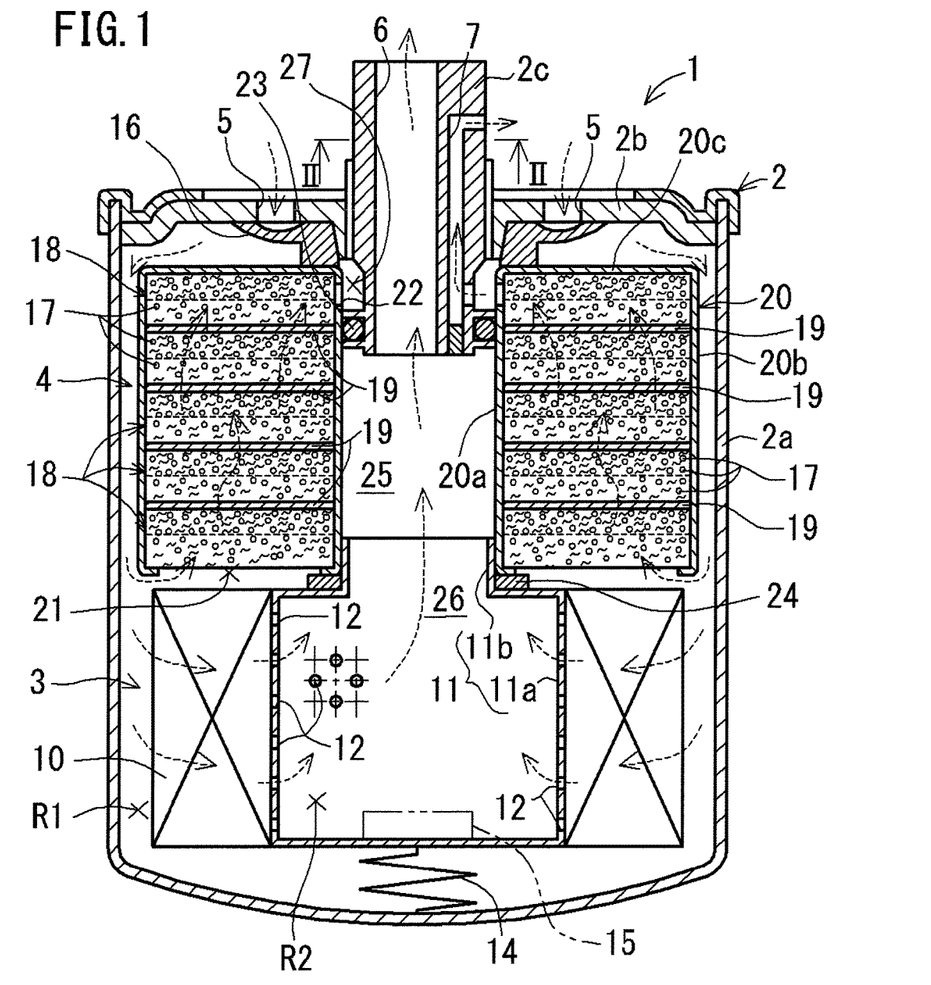
FIG. 1 is a longitudinal sectional view illustrating an oil deterioration prevention device according to the first embodiment.
Figure 5:
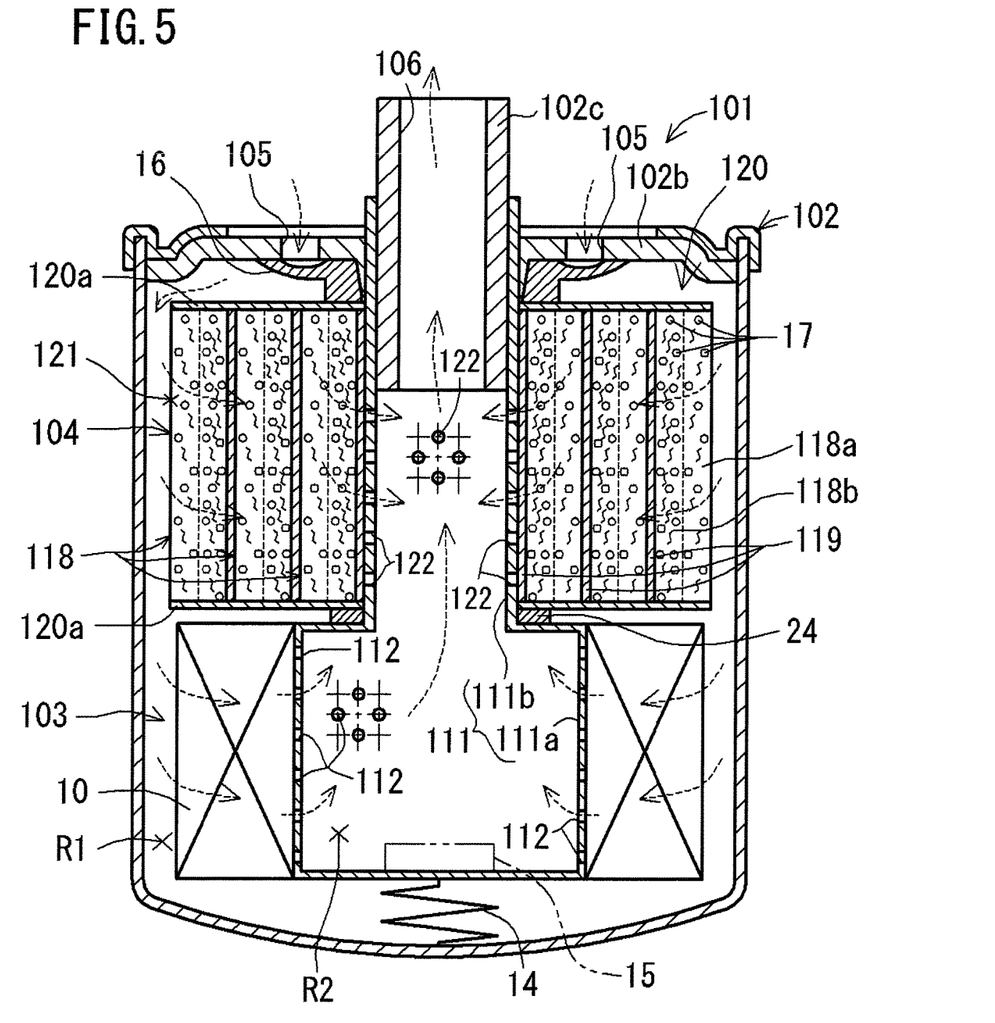
FIG. 5 is a longitudinal sectional view illustrating an oil deterioration prevention device according to the second embodiment.

The oil deterioration prevention device according to the first embodiment can be configured such that, for example, the deterioration prevention unit (4, 104) includes a porous layer (18, 118) that retains the deterioration prevention agent (17) and that allows oil to pass (see, for example, FIGS. 1 and 5). Examples of the material for the porous layer include fibrous material such as non-woven cloth, paper, woven fabric, or knitted fabric, a resin open-cell foamed material such as urethane, and a porous resin film.

Figure 4:
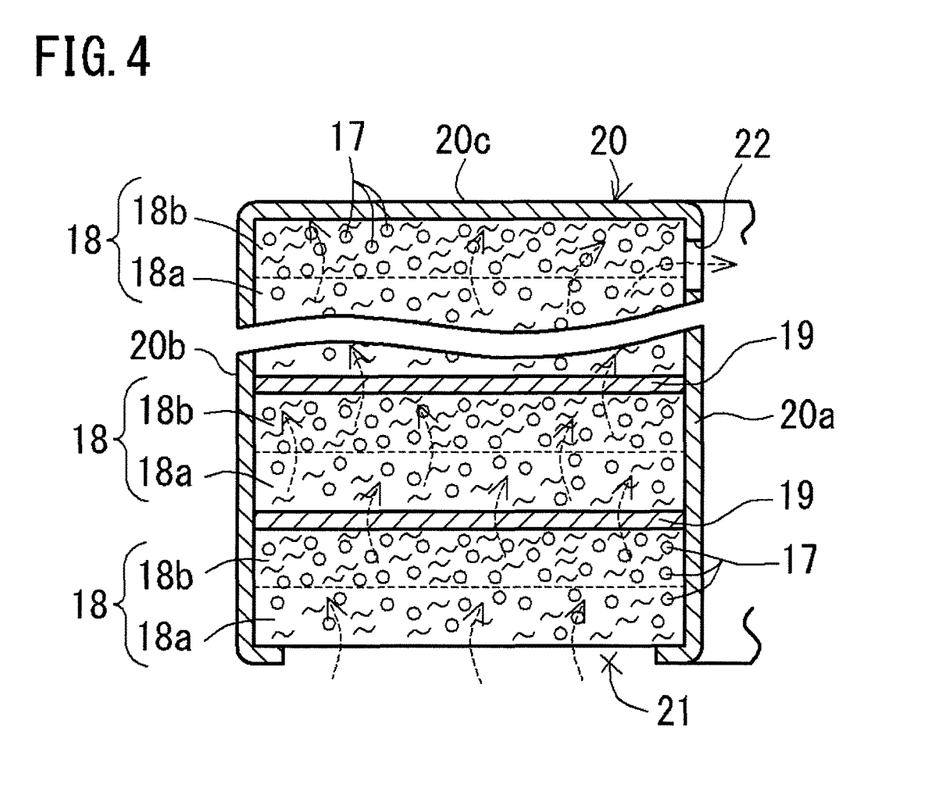
FIG. 4 is an explanatory view for describing the operation of the oil deterioration prevention device.

In the embodiment described above, it can be configured such that, for example, the porous layer (18, 118) includes a first porous layer (18*a*, 118*a*) and a second porous layer (18*b*, 118*b*) that are stacked in the oil passing direction, wherein the porosity of the first porous layer on the upstream side is larger than the porosity of the second porous layer on the downstream side (see FIG. 4, for example). In this case, the porosity of the first porous layer can be 0.7 to 0.99 (preferably 0.9 to 0.99), and the porosity of the second porous layer can be 0.5 to 0.95 (preferably 0.8 to 0.95). The "porosity" is generally calculated from an equation of {1−[basis weight of porous layer]/(thickness of porous layer× density of material forming porous layer)}. The basis weight of the porous layer means a weight per unit area of the porous layer. An average particle diameter of the deterioration prevention agent can be 0.01 to 500 μm (preferably, 5 to 200 μm), for example. The "average particle diameter" means a particle diameter (median diameter) when a cumulative weight becomes 50% in a particle size distribution measurement according to a laser diffractometry.

In the embodiment described above, the deterioration prevention unit (4, 104) can be configured to include an intermediate layer (19, 119) that is arranged between the plural porous layers (18, 118), does not allow the deterioration prevention agent (17) to pass, and allows oil to pass (see FIG. 4, for example). Examples of the material for the intermediate layer include fibrous material such as non-woven cloth, paper, woven fabric, or knitted fabric, a resin open-cell foamed material such as urethane, and a porous resin film.

The oil deterioration prevention device according to the first embodiment can be configured, for example, [A] to include a housing (2) housing the filtering unit (3) and the deterioration prevention unit (4), wherein the housing is provided with an oil inflow passage (5) for allowing oil fed from an oil containing unit (9) to be flown into the housing, an oil outflow passage (6) for allowing oil filtered by the filtering unit to be flown to a part to be lubricated, and an oil returning passage (7) for returning oil that is prevented from being deteriorated by the deterioration prevention unit to the oil containing unit (see FIG. 1, for example); or [B] to include a housing (102) housing the filtering unit (103) and the deterioration prevention unit (104), wherein the housing is provided with an oil inflow passage (105) allowing oil fed from an oil containing unit (9) to be flown into the housing, and an oil outflow passage (106) for allowing oil filtered by the filtering unit and oil prevented from being deteriorated by the deterioration prevention unit to be flown to a part to be lubricated (see FIG. 5, for example).

Figure 2:
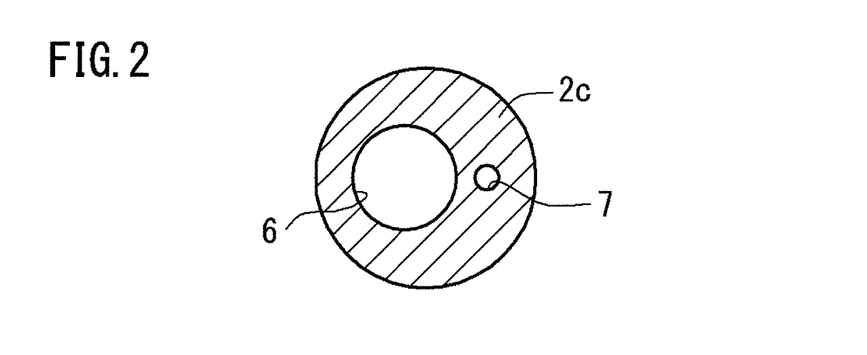
FIG. 2 is an enlarged sectional view taken along a line II-II in FIG. 1.

In the configuration [A], it can be configured such that, for example, the maximum horizontal sectional area (S1) of the oil outflow passage (6) is larger than the maximum horizontal sectional area (S2) of the oil returning passage (7) (see FIG. 2, for example). When thus configured, relatively large amount of oil is flown to the oil outflow passage to preferably lubricate the part to be lubricated, while relatively small amount of oil is flown to the oil returning passage to further reduce the oilflow resistance. In this case, the ratio (S1/S2) of the maximum horizontal sectional areas of the respective passages can be 10 to 1000 (preferably 50 to 200), for example.

In the configuration [A] described above, it can be configured such that, for example, the filtering unit (3) and the deterioration prevention unit (4) are provided to separate the internal space of the housing (2) into an upstream space (R1), which is continuous with the oil inflow passage (5), and a downstream space (R2), which is continuous with the oil outflow passage (6). In addition, it can be configured such that the deterioration prevention unit (4) includes a containing case (20) that contains the deterioration prevention agent (17), wherein the containing case is provided with an inflow port (21) that is open to the upstream space and an outflow port (22) that is isolated from the upstream space and the downstream space and is continuous with the oil returning passage (7) (see FIG. 1, for example). According to this configuration, oil fed from the oil containing unit is flown into the upstream space in the housing via the oil inflow passage, and the oil filtered by the filtering unit is flown to the part to be lubricated through the downstream space and the oil outflow passage, while the oil flown into the containing case from the inflow port is prevented from being deteriorated by the deterioration prevention agent before being returned to the oil containing unit via the outflow port and the oil returning passage.

In the embodiment [B] described above, it can be configured such that, for example, the filtering unit (103) and the deterioration prevention unit (104) are provided to separate the internal space of the housing (102) into an upstream space (R1) continuous with the oil inflow passage (105), and a downstream space (R2) continuous with the oil outflow passage (106). In addition, it can be configured such that the deterioration prevention unit (104) includes a containing unit (120) that contains the deterioration prevention agent (17), wherein the containing unit is provided with an inflow port (121) that is open to the upstream space and an outflow port (122) that is open to the downstream space (see FIG. 5, for example). According to this configuration, oil fed from the oil containing unit is flown into the upstream space in the housing via the oil inflow passage, and the oil filtered by the filtering unit is flown to the part to be lubricated through the downstream space and the oil outflow passage, while the oil flown into the containing unit from the inflow port is prevented from being deteriorated by the deterioration prevention unit before flown to the part to be lubricated via the outflow port, the downstream space, and the oil outflow passage.

In the embodiment [A] described above, it can be configured such that, for example, the filtering unit (3) and the deterioration prevention unit (4), both of cylindrical shape, are axially arranged in the housing (2), the containing case (20) has a cylindrical inner wall (20a) and outer wall (20b), and a plate-like bottom wall (20c) coupling one end of the inner wall and one end of the outer wall, the inflow port (21) is formed on one end of the containing case in the axial direction so as to be open facing an end face of the cylindrical filter element (10) in the axial direction, the outflow port (22) is formed on the other end of the containing case in the axial direction, and the deterioration prevention agent (17) is stored in a space enclosed by the inner wall, the outer wall, and the bottom wall of the containing case (see FIG. 1, for example). According to this configuration, oil flown into the containing case from the inflow port flows all over the deterioration prevention agent and then flows to the oil returning passage from the outflow port, whereby the effect of preventing deterioration of oil by the deterioration prevention unit can further be enhanced. In addition, the filtering unit and the deterioration prevention unit can easily be arranged, and the device can be downsized.

[Embodiments]

The present invention will specifically be described with reference to the drawings. The present embodiments describe an oil deterioration prevention device that prevents deterioration of engine oil (hereinafter merely referred to as "oil" in some cases) as one example.

<First Embodiment>

(1) Oil Deterioration Prevention Device

Figure 3:
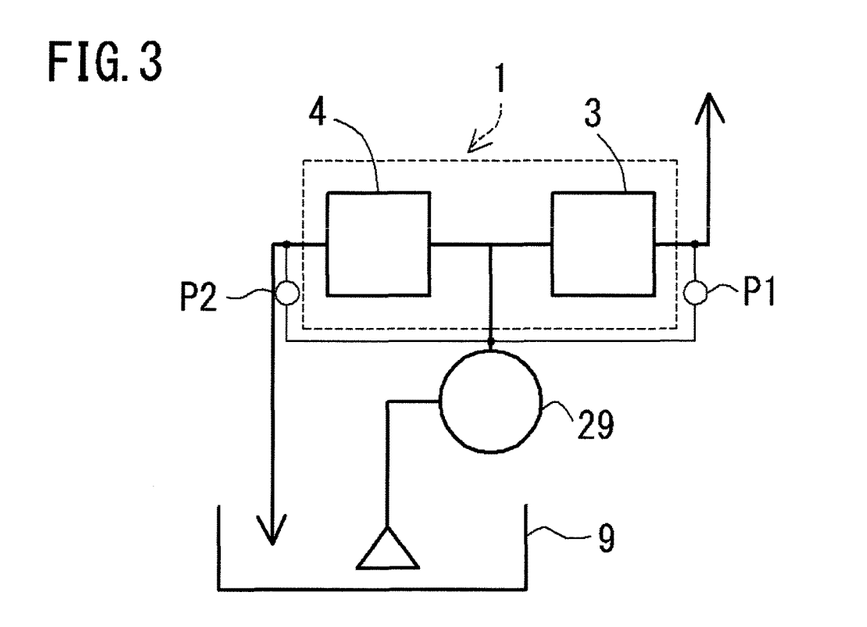
FIG. 3 is an explanatory view for describing an operation of the oil deterioration prevention device.

An oil deterioration prevention device 1 according to the present embodiment includes a filtering unit 3 and a deterioration prevention unit 4, which are housed in a housing 2, as illustrated in FIG. 1. The housing 2 has a case 2a that is a cylindrical bottomed case with one end in the axial direction open, a disc-like bottom plate 2b that closes the open one end of the case 2a, and a shaft member 2c that is threaded to a hole formed on the center of the bottom plate 2b. A plurality of oil inflow passages 5 are formed around the hole on the bottom plate 2b along a circumferential direction with a predetermined space. Each of the oil inflow passages 5 is connected to an oil pan 9 (described as "oil containing unit" according to the present invention, see FIG. 3) storing oil via a pipe or the like. A rubber check valve 16 is provided in the housing 2 to cover the openings of the oil inflow passages 5.

An oil outflow passage 6 for feeding oil, which is filtered by the filtering unit 3, to a part to be lubricated in an engine (e.g., a crankshaft, a cylinder wall, a valve mechanism, and the like) is formed on the center of the shaft member 2c. The oil outflow passage 6 is connected to the part to be lubricated in the engine via a passage formed in the engine. An oil returning passage 7 for returning oil, which is prevented from being deteriorated by the deterioration prevention unit 4, to the oil pan 9 is formed on the shaft member 2c on the outer periphery of the oil outflow passage 6. The oil returning passage 7 is connected to the oil pan 9 via a pipe or the like. As illustrated in FIG. 2, a horizontal sectional area S1 of the oil outflow passage 6 is set as about 113 $mm^2$, and a horizontal sectional area S2 of the oil returning passage 7 is set as about 1.13 $mm^2$. Therefore, a ratio (S1/S2) of the horizontal sectional areas of these passages 6 and 7 is about 100.

As illustrated in FIG. 1, the filtering unit 3 includes a filter element 10 that filters oil. The filter element 10 is formed cylindrical by folding a non-woven sheet material into pleats (also referred to as chrysanthemum shape). A cylindrical protector 11 with a number of through-holes 12 is mounted on the inner periphery of the filter element 10. The protector 11 includes a large-diameter portion 11a supporting the filter element 10 and a small-diameter portion 11b projecting from one end of the large-diameter portion 11a in the axial direction. The filter element 10 is provided to separate an internal space of the housing 2 into an upstream space R1 that is continuous with the oil inflow passage 5, that is, a space before the filtering (in which, oil that is not yet filtered is present) and a downstream space R2 that is continuous with the oil outflow passage 6, that is, a space after the filtering (i.e., filtered oil is present).

The protector 11 is biased toward the bottom plate 2b by a spring 14 provided between with the case 2a. A known relief valve 15 is provided on one end of the protector 11 in the axial direction. The relief valve 15 allows the space R1 and the space R2 to communicate with each other, when a pressure difference between the upstream space R1 and the downstream space R2 of the filter element 10 in the housing 2 exceeds a set value.

As illustrated in FIG. 1, the deterioration prevention unit 4 includes powdery deterioration prevention agents 17 made of hydrotalcite preventing the deterioration of oil. The deterioration prevention agents 17 are retained by a plurality (five in FIG. 1) of cylindrical porous layers 18 made of non-woven fabric that allow oil to pass. In the present embodiment, the powdery deterioration prevention agents 17 are dispersed and mixed during the process of forming the porous layers 18.

Each of the porous layers 18 includes a first porous layer 18a and a second porous layer 18b that are stacked in a passing direction of oil, as illustrated in FIG. 4. The porosity of the first porous layer 18a on the upstream side is set to about 0.98, while the porosity of the second porous layer 18b on the downstream side is set to about 0.92. Therefore, the density of the first porous layer 18a is smaller than the density of the second porous layer 18b, and the second porous layer 18b retains more deterioration prevention agents 17 than the first porous layer 18a. A ring plate-shaped intermediate layer 19 made of a non-woven cloth is arranged between the porous layers 18, which intermediate layer 19 does not allow the deterioration prevention agents 17 to pass but allows oil to pass.

As illustrated in FIG. 1, the porous layers 18 and the intermediate layer 19 are contained in the containing case 20. The containing case 20 includes cylindrical inner and outer walls 20a, 20b, which are concentrically arranged, and a ring plate-shaped bottom wall 20c that couples one end of the inner wall 20a and one end of the outer wall 20b. The containing case 20 has, on one end in the axial direction, an inflow port 21 that is open to face an end face of the filter element 10 in the axial direction, and on the other end in the axial direction, an outflow port 22 that is continuous with the oil returning passage 7. The porous layer 18 and the intermediate layer 19 are stacked and contained in a space enclosed by the inner wall 20a, the outer wall 20b, and the bottom wall 20c of the containing case 20.

The small-diameter portion 11b of the protector 11 is inserted into one end of the inner wall 20a of the containing case 20, and the leading end of the shaft member 2c is inserted into the other end. A rubber annular seal member 23 provided on the outer periphery of the leading end of the shaft member 2c is in pressed contact with the inner wall 20a of the containing case 20. The containing case 20 is axially held between the check valve 16 and a rubber annular seal member 24 arranged on the outer periphery of the small-diameter portion 11b of the protector 11. An internal space 25 of the inner wall 20a of the containing case 20 is continuous with an inner space 26 of the protector 11 and the oil outflow passage 6. The outflow port 22 of the containing case 20 is isolated from the internal space 25 of the inner wall 20a via the space 27 enclosed by the check valve 16, the seal member 23, the inner wall 20a, and the shaft member 2c, and is continuous with the oil returning passage 7.

(2) Operation of Oil Deterioration Prevention Device

Subsequently, an operation of the oil deterioration prevention device 1 having the above-mentioned configuration will be described. Oil stored in the oil pan 9 is fed to the oil deterioration prevention device 1 by an operation of a pump 29 (see FIG. 3). As illustrated in FIG. 1, the oil fed into the oil inflow passage 5 flows into the upstream space R1 in the housing 2 by elastically deforming the check valve 16, and sequentially reaches the filtering unit 3 and the deterioration prevention unit 4.

The oil reaching the filtering unit 3, after foreign matters (for example, dust, metal wear fragments, sludge, and the like) are trapped by the filter element 10, is fed to the part to be lubricated in the engine through the downstream space R2 and the oil outflow passage 6 via the through-holes 12 on the protector 11. On the other hand, the oil reaching the deterioration prevention unit 4 flows into the containing case 20 via the inflow port 21, and passes through the porous layer 18 and the intermediate layer 19, where foreign matters in the oil (for example, acid substances generated in the engine) are removed by being adsorbed on the deterioration prevention agent 17. The oil is then returned to the oil pan 9 through the space 27 and the oil returning passage 7 from the outflow port 22. Since a differential pressure P2 (several hundred kPa) of the deterioration prevention unit 4 is generally larger than a differential pressure P1 (several kPa) of the filtering unit 3 (see FIG. 3), an appropriate amount of oil can pass through the deterioration prevention unit 4, whereby a profound effect of preventing deterioration of oil can be obtained.

(3) Effect of Embodiment

From the above, according to the oil deterioration prevention device 1 according to the present embodiment, the oil fed from the oil pan 9 is distributed into the filtering unit 3 and the deterioration prevention unit 4. The oil filtered by the filtering unit 3 is fed to the part to be lubricated in the engine without passing through the deterioration prevention unit 4, while the oil that is prevented from being deteriorated by the deterioration prevention unit 4 is returned to the oil pan 9 without passing through the filtering unit 3. According to this configuration, some oil fed from the oil pan 9 undergoes bypass flow, whereby oilflow resistance is reduced, resulting in preventing increase in pressure loss.

In the present embodiment, the deterioration prevention unit 4 includes the porous layer 18, whereby the porous layer can retain the deterioration prevention agents 17 (hydrotalcite) in an appropriate dispersed manner. Accordingly, the oilflow resistance can further be reduced, and the effect of preventing deterioration of oil by the deterioration prevention unit 4 can further be enhanced.

In the present embodiment, the porous layer 18 includes the first porous layer 18a and the second porous layer 18b, and the porosity of the first porous layer 18a on the upstream side is larger than the porosity of the second porous layer 18b on the downstream side. Therefore, the second porous layer 18b can retain more deterioration prevention agents 17 than the first porous layer 18a. Accordingly, oil gradually spreads from the first porous layer 18a to the second porous layer 18b (see FIG. 4). Accordingly, the oilflow resistance can further be reduced, and the oil deterioration prevention effect by the deterioration prevention unit 4 can further be enhanced.

In the present embodiment, since the deterioration prevention unit 4 includes the intermediate layer 19, the deterioration prevention agents 17 do not move between a plurality of the porous layers 18 due to the intermediate layer 19. Therefore, aggregation of the deterioration prevention agent 17 on the downstream porous layer 18 is prevented. Accordingly, the oilflow resistance can further be reduced, and the oil deterioration prevention effect by the deterioration prevention unit 4 can further be enhanced.

In the present embodiment, since the housing 2 houses the filtering unit 3 and the deterioration prevention unit 4, and the housing 2 is provided with the oil inflow passage 5, the oil outflow passage 6, and the oil returning passage 7, oil fed from the oil pan 9 is flown into the housing 2 through the oil inflow passage 5, oil filtered by the filtering unit 3 is flown to the part to be lubricated through the oil outflow passage 6, and oil that is prevented from being deteriorated by the deterioration prevention unit 4 is returned to the oil pan 9 through the oil returning passage 7. Thus, the oil deterioration prevention device 1, the filtering unit 3, and the deterioration prevention unit 4 can easily be replaced.

In the present embodiment, the horizontal sectional area S1 of the oil outflow passage 6 is larger than the horizontal sectional area S2 of the oil returning passage 7. According to this configuration, relatively large amount of oil is flown to the oil outflow passage 6 to preferably lubricate the part to be lubricated, while relatively small amount of oil is flown to the oil returning passage 7 to further reduce the oilflow resistance.

In the present embodiment, the filtering unit 3 and the deterioration prevention unit 4 are provided to separate the internal space of the housing 2 into the upstream space R1 continuous with the oil inflow passage 5 and the downstream space R2 continuous with the oil outflow passage 6, and the deterioration prevention unit 4 includes the containing case 20 that contains the deterioration prevention agent 17. The containing case 20 is provided with the inflow port 21 that is open to the upstream space R1 and the outflow port 22 that is isolated from the upstream space R1 and the downstream space R2 and is continuous with the oil returning passage 7. Accordingly, oil fed from the oil pan 9 is flown into the upstream space R1 in the housing 2 through the oil inflow passage 5 and oil filtered by the filtering unit 3 is flown to the part to be lubricated through the downstream space R2 and the oil outflow passage 6, while oil flown into the containing case 20 from the inflow port 21 is returned to the oil pan 9 via the outflow port 22 and the oil returning passage 7 after prevented from being deteriorated by the deterioration prevention agent 17.

In the present embodiment, the cylindrical filtering unit 3 and the deterioration prevention unit 4 are axially arranged in the housing 2, the containing case 20 has the cylindrical inner and outer walls 20a, 20b, and the plate-like bottom wall 20c coupling one end of the inner wall 20a and one end of the outer wall 20b, the inflow port 21 is formed on one end of the containing case 20 in the axial direction so as to be open facing an end face of the cylindrical filter element 10 in the axial direction, the inflow port 22 is formed on the other end of the containing case 20 in the axial direction, and the deterioration prevention agent 17 is contained in a space enclosed by the inner wall 20a, the outer wall 20b, and the bottom wall 20c of the containing case 20. Accordingly, oil flown into the containing case 20 from the inflow port 21 flows all over the deterioration prevention agent 17 and then flows into the oil returning passage 7 from the outflow port 22. Consequently, the effect of preventing deterioration of oil by the deterioration prevention unit 4 can further be enhanced. In addition, the filtering unit 3 and the deterioration prevention unit 4 can easily be arranged, whereby the device can be downsized.

<Second Embodiment>

An oil deterioration prevention device according to the second embodiment will next be described. In the oil deterioration prevention device according to the second embodiment, the substantially same components as those in the oil deterioration prevention device 1 according to the first embodiment are identified by the same numerals, and the redundant description will not be repeated.

(1) Oil Deterioration Prevention Device

Figure 6:
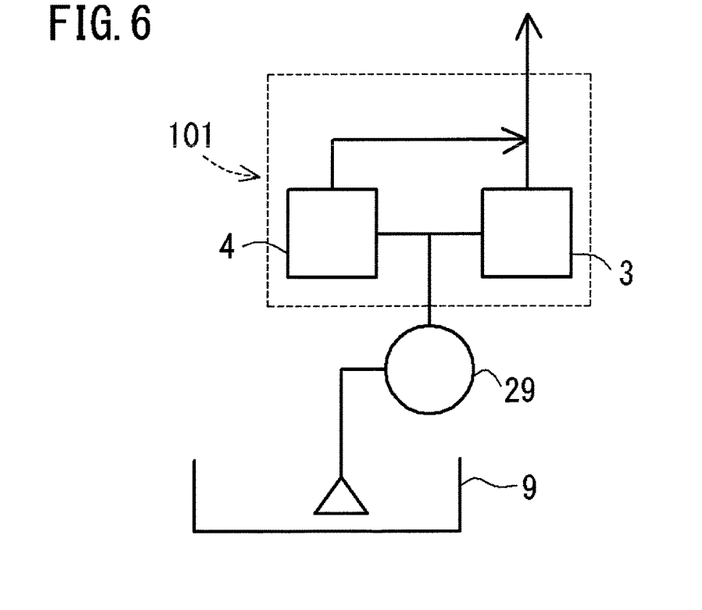
FIG. 6 is an explanatory view for describing an operation of the oil deterioration prevention device.

An oil deterioration prevention device 101 according to the present embodiment includes a filtering unit 103 and a deterioration prevention unit 104, which are housed in a housing 102, as illustrated in FIG. 5. The housing 102 has a case 102a that is a cylindrical bottomed case with one end in the axial direction open, a disc-like bottom plate 102b that closes the open one end of the case 102a, and a shaft member 102c that is threaded to a hole formed on the center of the bottom plate 102b. A plurality of oil inflow passages 105 are formed around the hole on the bottom plate 102b along a circumferential direction with a predetermined space. Each of the oil inflow passages 105 is connected to an oil pan 9 (described as "oil containing unit" according to the present invention, see FIG. 6) storing oil via a pipe. A rubber check valve 16 is provided in the housing 102 to cover the openings of the oil inflow passages 105.

An oil outflow passage 106 for feeding oil, which is filtered by the filtering unit 103, to a part to be lubricated in an engine (e.g., a crankshaft, a cylinder wall, a valve mechanism, and the like) is formed on the center of the shaft member 102c. The oil outflow passage 106 is connected to the part to be lubricated in the engine via a passage and the like formed in the engine. A communication path 107 continuous with the oil outflow passage 106 is formed on the outer periphery of the shaft member 102c.

The filtering unit 103 includes a filter element 10 that filters oil. A cylindrical protector 111 is mounted on the inner periphery of the filter element 10. The protector 111 includes a large-diameter portion 111a supporting the filter element 10 and a small-diameter portion 111b projecting from one end of the large-diameter portion 111a in the axial direction.

A number of through-holes 112 are formed on the outer periphery of the large-diameter portion 111a. One end of the small-diameter portion 111b is fixed to the outer periphery of the shaft member 102c. The filter element 10 is provided to separate an internal space of the housing 102 into an upstream space R1 continuous with the oil inflow passage 105, that is, a space before the filtering (where oil not yet filtered is present) and a downstream space R2 continuous with the oil outflow passage 106, that is, a space after the filtering (where filtered oil is present). The protector 111 is biased toward the bottom plate 2b by a spring 14 provided between the protector 111 and the case 2a. A known relief valve 15 is provided on one end of the protector 111 in the axial direction.

The deterioration prevention unit 104 includes powdery deterioration prevention agents 17 made of hydrotalcite for preventing the deterioration of oil. The deterioration prevention agents 17 are retained by a plurality of (three in FIG. 5) cylindrical porous layers 118 made of non-woven fabric that allow oil to pass. These plural porous layers 118 are concentrically arranged about the shaft center of the housing 102. In the present embodiment, the powdery deterioration prevention agents 17 are dispersed and mixed during the process of forming the porous layer 118.

Each of the porous layers 118 includes a first porous layer 118a and a second porous layer 118b that are stacked in a passing direction of oil. The porosity of the first porous layer 118a on the upstream side is about 0.98, while the porosity of the second porous layer 118b on the downstream side is about 0.92. Therefore, the density of the first porous layer 118a is smaller than the density of the second porous layer 118b, and the second porous layer 118b retains more deterioration prevention agents 17 than the first porous layer 118a. A ring plate-shaped intermediate layer 119 made of a non-woven cloth is arranged between the porous layers 118, wherein the intermediate layer 119 does not allow the deterioration prevention agents 17 to pass, but allows oil to pass.

The porous layers 118 and the intermediate layers 119 are contained in the containing unit 120. The containing unit 120 includes the small-diameter portion 111b of the protector 111 and upper and lower annular plates 120a arranged on the outer periphery of the small-diameter portion 111b. An inflow port 121 that is open to the upstream space R1 is formed on the outer periphery of the containing unit 120. An outflow port 122 that is open to the downstream space R2 is formed on the small-diameter portion 111b.

(2) Operation of Oil Deterioration Prevention Device

Subsequently, an operation of the oil deterioration prevention device 101 having the above-mentioned configuration will be described. Oil stored in the oil pan 9 is fed to the oil deterioration prevention device 101 by an operation of a pump 29 (see FIG. 6). As illustrated in FIG. 5, the oil fed into the oil inflow passage 105 flows into the upstream space R1 in the housing 102 by elastically deforming the check valve 16, and sequentially reaches the filtering unit 103 and the deterioration prevention unit 104.

The oil reaching the filtering unit 103 is, after foreign matters thereof (for example, dust, metal wear fragments, and sludge) being trapped by the filter element 10, fed to the part to be lubricated in the engine through the downstream space R2 and the oil outflow passage 106 via the through-holes 112 on the protector 111. On the other hand, the oil reaching the deterioration prevention unit 104 flows into the containing unit 120 via the inflow port 121, and passes through the porous layer 118 and the intermediate layer 119, where foreign matters in the oil (for example, acid substances generated in the engine) are removed by being adsorbed on the deterioration prevention agent 17. The oil is then fed to the part to be lubricated in the engine through the downstream space R2 and the oil outflow passage 106 from the outflow port 122.

(3) Effect of Embodiment

As described above, the oil deterioration prevention device 101 according to the present embodiment can bring the operation and effect same as those brought by the oil deterioration prevention device 1 according to the first embodiment. In addition, the oil fed from the oil pan 9 is distributed into the filtering unit 103 and the deterioration prevention unit 104. The oil filtered by the filtering unit 103 is fed to the part to be lubricated in the engine without passing through the deterioration prevention unit 104, while the oil that is prevented from being deteriorated by the deterioration prevention unit 104 is fed to the part to be lubricated in the engine without passing through the filtering unit 103. Accordingly, some oil fed from the oil pan 9 undergoes bypass flow, whereby oilflow resistance is reduced, resulting in preventing increase in pressure loss.

In the present embodiment, since the housing 102 houses the filtering unit 103 and the deterioration prevention unit 104, and the housing 102 is provided with the oil inflow passage 105 and the oil outflow passage 106, oil fed from the oil pan 9 is flown into the housing 102 through the oil inflow passage 105, oil filtered by the filtering unit 103 is flown to the part to be lubricated through the oil outflow passage 106, and oil that is prevented from being deteriorated by the deterioration prevention unit 104 is flown to the part to be lubricated via the oil outflow passage 106.

In the present embodiment, the filtering unit 103 and the deterioration prevention unit 104 are provided to separate the internal space of the housing 102 into the upstream space R1 continuous with the oil inflow passage 105 and the downstream space R2 continuous with the oil outflow passage 106, and the deterioration prevention unit 104 includes the containing unit 120 that contains the deterioration prevention agent 17. Additionally, the containing unit 120 is provided with the inflow port 121 that is open to the upstream space R1 and the outflow port 122 that is open to the downstream space R2. Accordingly, oil fed from the oil pan 9 is flown into the upstream space R1 in the housing 102 via the oil inflow passage 105, and the oil filtered by the filtering unit 103 is flown to the part to be lubricated through the downstream space R2 and the oil outflow passage 106, while the oil flown into the containing unit 120 from the inflow port 121 is flown to the part to be lubricated via the outflow port 122, the downstream space R2, and the oil outflow passage 106, after prevented from being deteriorated by the deterioration prevention agent 17.

Figure 7:
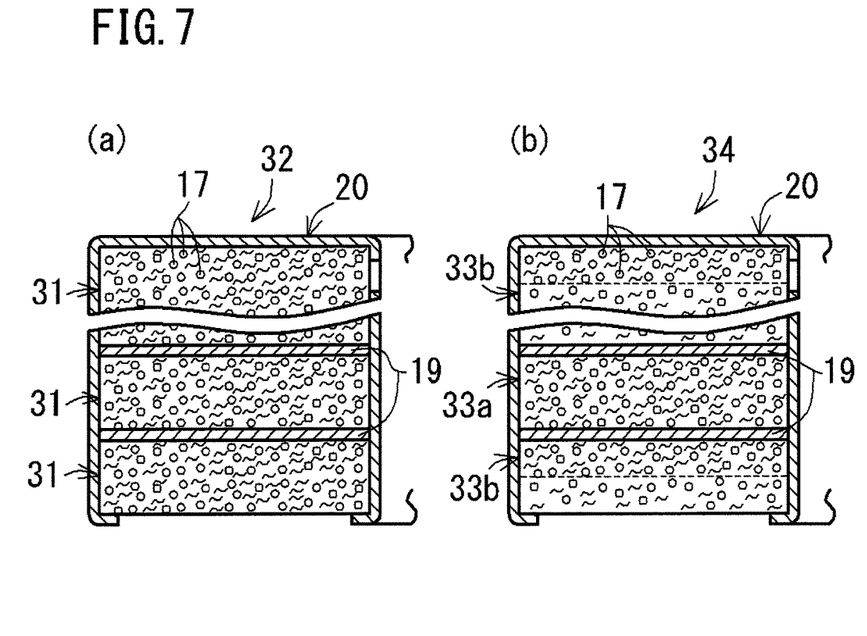
FIG. 7(a) is a longitudinal sectional view illustrating an essential part of a deterioration prevention device according to another embodiment, in which each of a plurality of porous layers has a single-layer structure.
FIG. 7(b) is a longitudinal sectional view illustrating the essential part of the deterioration prevention device according to the embodiment, in which a porous layer having a single-layer structure and a porous layer having a multi-layer structure are combined.

The present invention is not limited to the first and second embodiments, and various modifications are possible without departing form the scope of the present invention depending on a purpose and usage. The first and second embodiments described above illustrate the deterioration prevention units 4 and 104 respectively including a plurality of the porous layers 18 and 118, each one layer of which has a multilayer structure including the first and second porous layers 18a, 18b, and 118a, 118b. However, the invention is not limited thereto. As illustrated in FIG. 7(a), a deterioration prevention unit 32 may be provided to include a plurality of porous layers 31, each of which has a single layer structure, or as illustrated in FIG. 7(b), a deterioration prevention unit 34 may be provided to include a porous layer 33a having a single layer structure and a porous layer 33b having a multilayer structure in combination.

The first and second embodiments described above illustrate that the porous layers 18 and 118 include two layers, that is, the first and second porous layers 18a, 18b, 118a and 118b. However, the invention is not limited thereto. For example, the porous layer may include three or more layers, each having a different porosity. The first and second embodiments described above illustrate the deterioration prevention units 4 and 104 including the intermediate layers 19 and 119 arranged between a plurality of the porous layers 18 and 118. However, the invention is not limited thereto. For example, a deterioration prevention unit may be configured such that the intermediate layer 19 is not arranged, and the adjacent porous layers 18 and 118 out of a plurality of the porous layers 18 and 118 are directly stacked. The first and second embodiments described above illustrate the deterioration prevention unit 4 having the porous layers 18 and 118 contained in the containing case 20 or the containing unit 120. However, the invention is not limited thereto. For example, the containing case 20 or the containing unit 120 may not be provided, and the porous layers 18 and 118 may be arranged in the housing 2.

Figure 8:
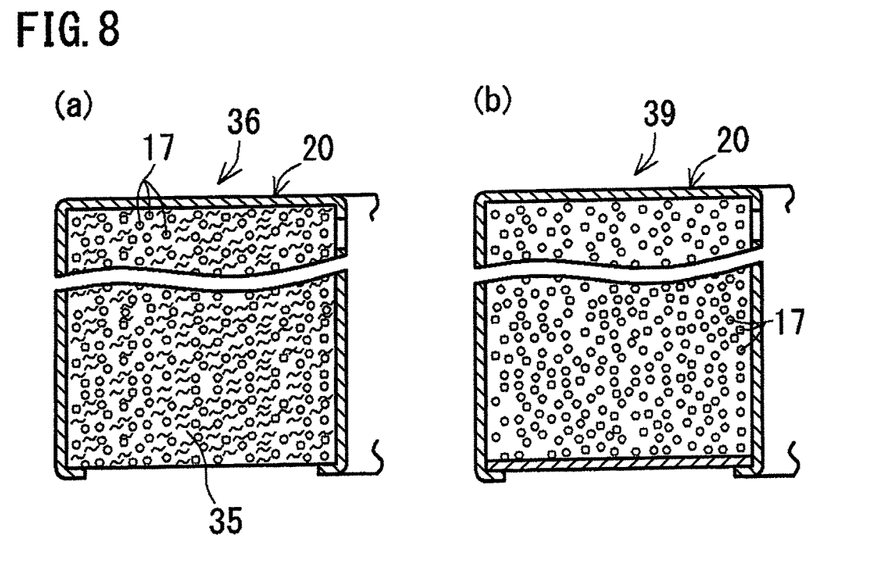
FIG. 8(a) is a longitudinal sectional view illustrating an essential part of a deterioration prevention device according to another embodiment, in which a single porous layer is provided.
FIG. 8(b) is a longitudinal sectional view illustrating the essential part of the deterioration prevention device according to the embodiment, in which a deterioration prevention agent is filled, instead of providing a porous layer.

The first and second embodiments described above illustrate the deterioration prevention units 4 and 104 including a plurality of the porous layers 18 and 118. However, the invention is not limited thereto. For example, as illustrated in FIG. 8(a), a deterioration prevention unit 36 including a single porous layer 35 may be provided. The first and second embodiments described above illustrate the deterioration prevention units 4 and 104 including the porous layers 18 and 118 that retain the powdery deterioration prevention agent 17. However, the invention is not limited thereto. For example, as illustrated in FIG. 8(b), a deterioration prevention unit 39 may be provided to have the deterioration prevention agent 17 enclosed in the containing case 20 (or in the containing unit 120) without the porous layers 18 and 118.

The first and second embodiments illustrate the oil deterioration prevention devices 1 and 101 of a type in which the whole device including the housing 2 and 102 is replaced (a so-called spin-on type). However, the invention is not limited thereto. For example, an oil deterioration prevention device of a type in which the housing 2 and 102 can be disassembled to replace directly the filtering units 3 and 103 and the deterioration prevention units 4 and 104 may be employed.

The first and second embodiments described above illustrate that the filtering units 3 and 103 and the deterioration prevention units 4 and 104 are housed in a single housing 2 and 102. However, the invention is not limited thereto. For example, the filtering units 3 and 103 may be housed in a first housing, and the deterioration prevention units 4 and 104 may be housed in a second housing different from the first housing.

The first and second embodiments illustrate the oil deterioration prevention devices 1 and 101 used in a wet sump engine. However, the invention is not limited thereto. The present invention may be applied to an oil deterioration prevention device used in a dry sump engine, or an oil deterioration prevention device used in an automatic transmission, for example.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

INDUSTRIAL APPLICABILITY

The present invention is widely used as a technique of preventing deterioration of oil. In particular, the present invention is well adaptable as a technique of preventing deterioration of engine oil in vehicles, such as an automobile, a bus, and a track, as well as a rail vehicle including a train such as a railroad train, a construction vehicle, an agricultural vehicle, and an industrial vehicle.

EXPLANATIONS OF LETTERS OR NUMERALS 1, 101; oil deterioration prevention device, 2, 102; housing, 3, 103; filtering unit, 4, 104, 32, 34, 36, 39; deterioration prevention unit 5, 105; oil inflow passage, 6, 106; oil outflow passage, 7; oil returning passage, 9; oil pan, 10; filter element, 17; deterioration prevention agent, 18, 118, 31, 33a, 33b, 35; porous layer, 18a, 118a; first porous layer, 18b, 118b; second porous layer, 19, 119; intermediate layer

The invention claimed is:
1. An oil deterioration prevention device comprising:
a filtering unit including a filter element that filters oil;
a deterioration prevention unit including a powdery deterioration prevention agent that prevents deterioration of oil, the powdery deterioration prevention agent comprising one of an inorganic ion-exchange material and an ion-exchange resin material, and
a housing that houses the filtering unit and the deterioration prevention unit, wherein
out of oil fed from an oil containing unit, oil filtered by the filtering unit is fed to a part to be lubricated,
the housing is provided with an oil inflow passage for allowing oil fed from the oil containing unit to flow into the housing, and an oil outflow passage for allowing oil filtered by the filtering unit to flow toward the part to be lubricated,
the deterioration prevention unit includes a porous layer that retains the deterioration prevention agent and that allows oil to pass, and an intermediate layer that does not allow deterioration agent to pass and that allows oil to pass,
the porous layer includes a first porous layer and a second porous layer that are stacked in a passing direction of oil, and
the intermediate layer includes a plate-shaped ring between the first porous layer and the second porous layer,
a porosity of the first porous layer on an upstream side is larger than a porosity of the second porous layer on a downstream side.

2. The oil deterioration prevention device according to claim 1,
further comprising an oil returning passage for returning oil that is prevented from being deteriorated by the deterioration prevention unit to the oil containing unit.

3. The oil deterioration prevention device according to claim 2, wherein the maximum horizontal sectional area of the oil outflow passage is larger than the maximum horizontal sectional area of the oil returning passage.

4. The oil deterioration prevention device according to claim 3, wherein the ratio of the maximum horizontal sectional area of the oil outflow passage to the maximum horizontal sectional area of the oil returning passage is 10 to 1000.

5. The oil deterioration prevention device according to claim 2, wherein the filtering unit and the deterioration prevention unit are provided to separate internal space of the housing into an upstream space continuous with the oil inflow passage, and a downstream space continuous with the oil outflow passage.

6. The oil deterioration prevention device according to claim 5, wherein the deterioration prevention unit includes a containing case that contains the deterioration prevention agent, and the containing case is provided with an inflow port open to the upstream space and an outflow port open to the downstream space.

7. The oil deterioration prevention device according to claim 6, wherein the filtering unit and the deterioration prevention unit are cylindrically shaped and axially arranged in the housing, the containing case has a cylindrical inner wall and a cylindrical outer wall, and a bottom wall coupling an end of the cylindrical inner wall and an end of the cylindrical outer wall, the inflow port is provided on an end of the containing case in the axial direction and open facing an end face of the cylindrical filter element, and the outflow port is provided on another end of the containing case in the axial direction.

* * * * *